(12) United States Patent
Lee et al.

(10) Patent No.: US 9,257,737 B2
(45) Date of Patent: Feb. 9, 2016

(54) ANTENNA SWITCHING CIRCUIT AND ELECTRONIC DEVICE AND ANTENNA SWITCHING METHOD THEREOF

(75) Inventors: Yen-Ching Lee, Taipei (TW); Shang-Ming Chiu, Taipei (TW)

(73) Assignee: Getac Technology Corporation, Hsinchu County (TW)

( * ) Notice: Subject to any disclaimer, the term of this patent is extended or adjusted under 35 U.S.C. 154(b) by 157 days.

(21) Appl. No.: 13/458,923

(22) Filed: Apr. 27, 2012

(65) Prior Publication Data

US 2013/0285878 A1 Oct. 31, 2013

(51) Int. Cl.
*H01Q 1/24* (2006.01)
*H04B 1/38* (2015.01)
*H04B 1/3877* (2015.01)

(52) U.S. Cl.
CPC ............ *H01Q 1/242* (2013.01); *H04B 1/3877* (2013.01)

(58) Field of Classification Search
CPC ................................. H01Q 1/242; H01Q 3/24
USPC ................. 343/846, 876; 455/83, 101, 550.1, 455/575.7
See application file for complete search history.

(56) References Cited

U.S. PATENT DOCUMENTS

| | | | |
|---|---|---|---|
| 5,722,089 A * | 2/1998 | Murakami | 455/575.7 |
| 5,801,661 A * | 9/1998 | Suzuki | 343/702 |
| 6,411,831 B1 * | 6/2002 | Oshimi et al. | 455/575.5 |
| 8,412,291 B2 * | 4/2013 | Harrison et al. | 455/575.7 |
| 2004/0192405 A1 * | 9/2004 | Van Bosch | 455/569.1 |
| 2007/0018895 A1 * | 1/2007 | Bolin | 343/702 |
| 2007/0120752 A1 * | 5/2007 | Takasu | 343/702 |
| 2008/0036681 A1 * | 2/2008 | Caesar | 343/876 |

FOREIGN PATENT DOCUMENTS

| | | |
|---|---|---|
| CN | 201260157 Y | 6/2009 |
| TW | I297972 | 6/2008 |
| TW | 201128993 A1 | 8/2011 |

* cited by examiner

*Primary Examiner* — Hoang V Nguyen
*Assistant Examiner* — Daniel J Munoz (57) ABSTRACT

An antenna switching circuit and an electronic device and an antenna switching method thereof are provided. The antenna switching circuit is disposed in the electronic device including an internal antenna and a RF module, and includes an external antenna connector and a controller. The external antenna connector has an independent ground terminal for receiving an independent ground signal, and the external antenna connector is electrically connected to an external antenna. The controller has a first RF terminal, a second RF terminal and a control terminal, the first RF terminal is electrically connected to the RF module, the second RF terminal is electrically connected to the internal antenna, and the control terminal detects the independent ground signal. When the controller detects no change in the independent ground signal, the controller electrically connects the RF module to the internal antenna; otherwise, the controller electrically connects the RF module to the external antenna.

8 Claims, 8 Drawing Sheets

FIG. 1

(PRIOR ART)

ANTENNA SWITCHING CIRCUIT AND ELECTRONIC DEVICE AND ANTENNA SWITCHING METHOD THEREOF

BACKGROUND

1. Field of the Invention

The invention relates to an antenna switching circuit. Particularly, the invention relates to an antenna switching circuit connected to an external docking device and an electronic device and an antenna switching method thereof.

2. Description of Related Art

Figure 1:
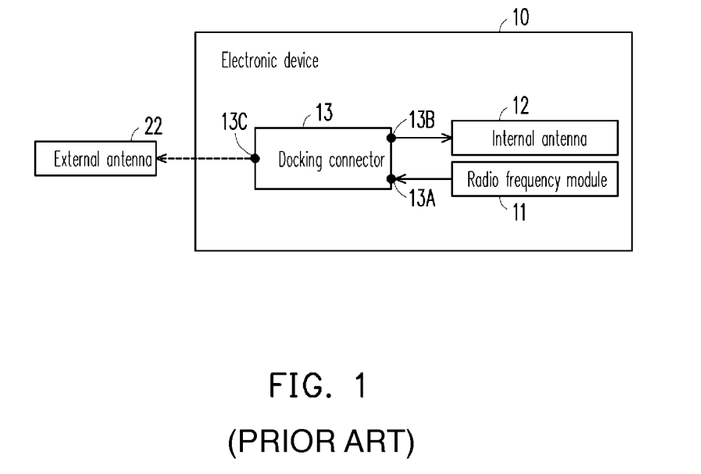
FIG. 1 is a schematic diagram of an electronic device connected to a docking device.

Vehicular telematics systems or industrial computers generally use a docking device to enhance convenience and performance of a computing device. Referring to FIG. 1, FIG. 1 is a schematic diagram of an electronic device connected to a docking device. The electronic device 10 includes a radio frequency (RF) module 11, an internal antenna 12 and a docking connector 13. The docking connector 13 is a mechanical docking connector which includes a first RF terminal 13A, a second RF terminal 13B and a third RF terminal 13C.

When the electronic device 10 is not connected to a docking device (not shown in FIG. 1), the first RF terminal 13A is electrically connected to the radio frequency module 11, and the second RF terminal 13B is electrically connected to the internal antenna 12. Therefore, the RF module 11 can transmit or receive RF signals through the internal antenna 12 of the electronic device 10.

When the electronic device 10 is connected to the docking device, the third RF terminal 13C is electrically connected to an external antenna 22 of the docking device. Thus, the electrical connection between the RF module 11 and the internal antenna 12 is disconnected, and the RF module 11 is electrically connected to the external antenna 22.

Figure 2:
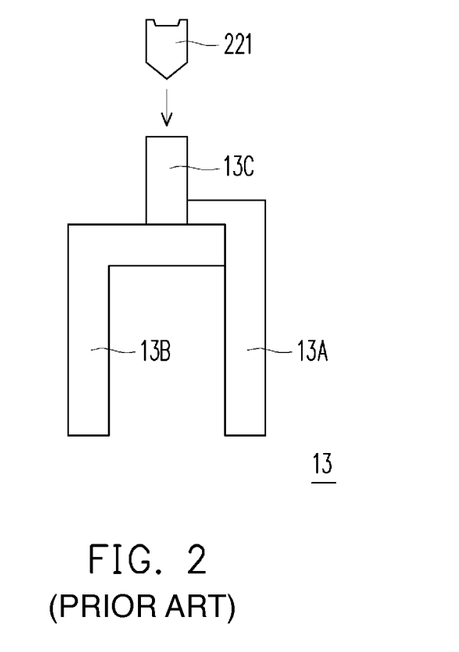
FIG. 2 is a schematic diagram illustrating a situation that a docking connector is unconnected to a docking device.

FIG. 2 is a schematic diagram illustrating a situation that a docking connector is not connected to a docking device. Referring to FIG. 2, the docking connector 13 is a mechanical docking connector. When the electronic device 10 is not connected to the docking device, a pogo connector 221 of the docking device is not in contact with the third RF terminal 13C. The first RF terminal 13A and the second RF terminal 13B are substantially in contact with each other, and the RF module 11 is electrically connected to the internal antenna 12.

Figure 3:
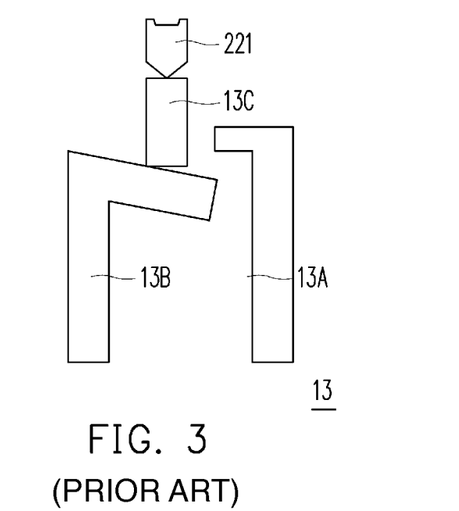
FIG. 3 is a schematic diagram illustrating a situation that a docking connector is connected to a docking device.

FIG. 3 is a schematic diagram illustrating a situation that a docking connector is connected to a docking device. When the electronic device 10 is connected to the docking device, not only the pogo connector 221 of the docking device is substantially in contact with the third RF terminal 13C, but also the first RF terminal 13A and the second RF terminal 13B are separated from each other. In this way, the electrical connection between the RF module 11 and the internal antenna 12 is disconnected. The RF module 11 is electrically connected to the external antenna 22 through the docking connector 13 and the pogo connector 221.

The mechanical docking connector (the docking connector 13) has advantages of being simple in structure and easy in usage. However, reliability of the mechanical docking connector is gradually decreased after multiple plug/unplug operations. Moreover, the mechanical docking connector results in high loss of transmission power of the RF signal. Therefore, it is an important issue in the field to design a docking connector with low loss in transmission power and stable reliability.

SUMMARY

The invention provides an antenna switching circuit, which is disposed in an electronic device including an internal antenna and a radio frequency (RF) module, and the antenna switching circuit includes an external antenna connector and at least one controller. The external antenna connector has an independent ground terminal configured for receiving an independent ground signal, and the external antenna connector is electrically connected to an external antenna. Moreover, the controller has a first RF terminal, a second RF terminal and at least one control terminal. The first RF terminal of the controller is electrically connected to the RF module, the second RF terminal of the controller is electrically connected to the internal antenna, and the control terminal of the controller is configured to detect the independent ground signal. Further, when the controller detects no change in the independent ground signal through the control terminal, the controller electrically connects the RF module to the internal antenna, and when the controller detects a change in the independent ground signal, the controller electrically connects the RF module to the external antenna.

The invention provides an electronic device including an antenna switching circuit, an internal antenna and an RF module. The antenna switching circuit includes an external antenna connector and at least one controller. The external antenna connector has an independent ground terminal configured for receiving an independent ground signal, and the external antenna connector is electrically connected to an external antenna. Moreover, the controller has a first RF terminal, a second RF terminal and at least one control terminal. The first RF terminal is electrically connected to the RF module, the second RF terminal is electrically connected to the internal antenna, and the control terminal is configured to detect the independent ground signal. Further, when the controller detects no change in the independent ground signal through the control terminal, the controller electrically connects the RF module to the internal antenna, and when the controller detects a change in the independent ground signal, the controller electrically connects the RF module to the external antenna.

The invention provides an antenna switching method, which is adapted to an electronic device. The antenna switching method includes following steps. An internal antenna and an RF module in the electronic device are electrically connected. An independent ground signal is detected. When there is a change in the independent ground signal, the RF module is electrically connected to an external antenna.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 4:
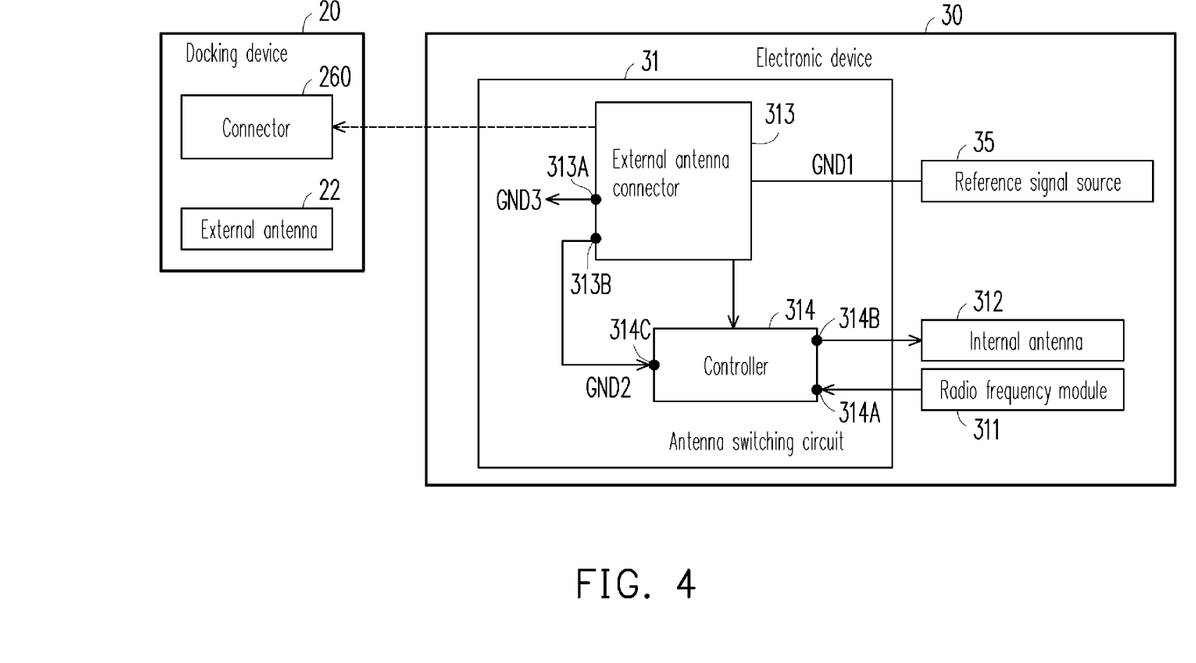
FIG. 4 is a block diagram of an electronic device according to a first embodiment of the invention.

FIG. 4 is a block diagram of an electronic device according to a first embodiment of the invention. Referring to FIG. 4, the electronic device 30 can be connected to a docking device 20 (or a docking system 20). The docking device 20 includes a connector 260 and an external antenna 22.

The electronic device 30 includes an antenna switching circuit 31, a radio frequency (RF) module 311, an internal antenna 312 and a reference signal source 35.

The antenna switching circuit 31 includes an external antenna connector 313 and one controller or a plurality of controllers 314.

The internal antenna 312 is configured to transmit or receive RF signals. The RF module 311 is configured to generate or process the RF signals. The controller 314 is electrically connected to the external antenna connector 313.

The reference signal source 35 has a first ground signal GND1. In the present embodiment, the first ground signal GND1 is a common ground signal of the electronic device 30.

The external antenna connector 313 has a connection terminal 313A and an independent ground terminal 313B. The independent ground terminal 313B has a second ground signal GND2. The connection terminal 313A has a third ground signal GND3. The external antenna connector 313 is configured to electrically connect to the external antenna 22 of the docking device 20. In the present embodiment, when the external antenna connector 313 and the reference signal source 35 are not electrically connected, the third ground signal GND3 is pre-configured as null, and the connection terminal 313A is regarded as applied with no signal. Then, the external antenna connector 313 and the reference signal source 35 are electrically connected, and the connection terminal 313A and the reference signal source 35 share the first ground signal GND1. At this time, the third ground signal GND3 is regarded as equal to the first ground signal GND1.

Figure 5:
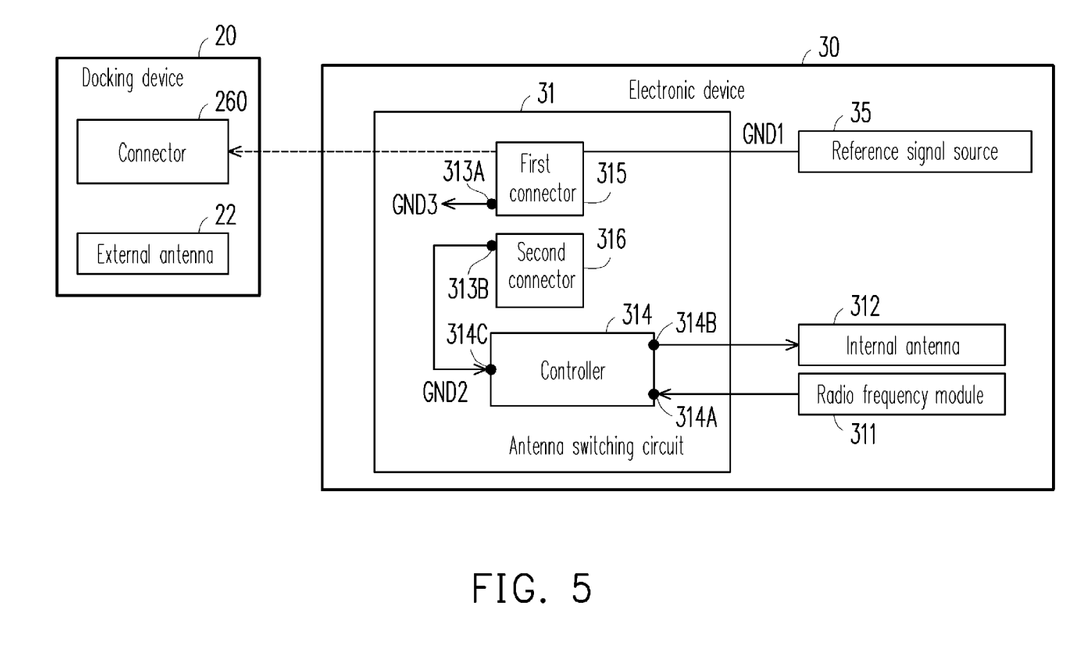
FIG. 5 is a block diagram of an electronic device according to a second embodiment of the invention.

The external antenna connector 313 may be a single connector (as shown in FIG. 4) or two connectors 315 and 316 (as shown in FIG. 5), where the first and the second connectors 315 and 316 are all external antenna connectors. When the electronic device 30 is connected to the docking device 20, the first and the second connectors 315 and 316 are connected to the connector 260 of the docking device 20. FIG. 5 is a block diagram of an electronic device according to a second embodiment of the invention. When the external antenna connector 313 has two connectors (the first and the second connectors 315 and 316), the connection terminal 313A is configured on one of the two connectors (for example, on the first connector 315 of FIG. 5), and the independent ground terminal 313B is configured on the other of the two connectors (for example, on the second connector 316 of FIG. 5).

The controller 314 has a first RF terminal 314A, a second RF terminal 314B and at least one control terminal 314C. The first RF terminal 314A is electrically connected to the RF module 311. The second RF terminal 314B is electrically connected to the internal antenna 312. The control terminal 314C is configured to detect the second ground signal GND2 of the independent ground terminal 313B.

Figure 6:
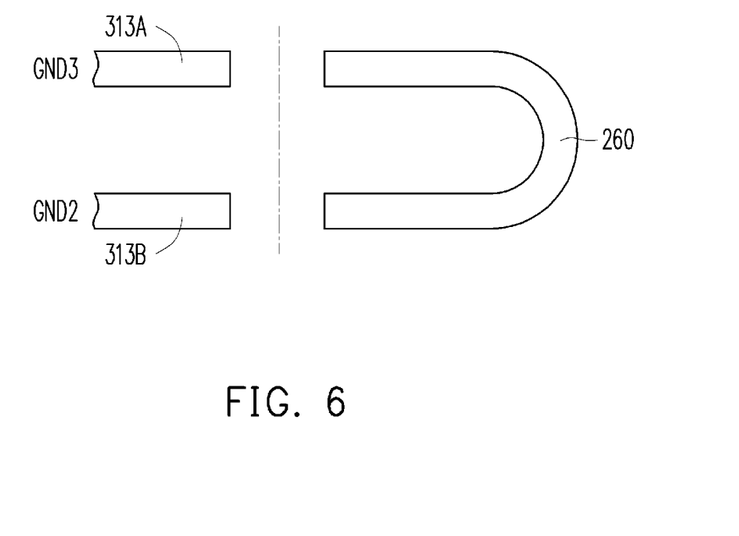
FIG. 6 is a schematic diagram illustrating a situation that an electronic device is not connected to a docking device according to the first embodiment of the invention.

When the electronic device 30 is not connected to the docking device 20 (as shown in FIG. 4 and FIG. 6), the second ground signal GND2 of the independent ground terminal 313B has a predetermined potential, for example, a floating signal potential. In the present embodiment, the predetermined potential is an independent ground signal. Since the electronic device 30 is not connected to the docking device 20, the second ground signal GND2 is regarded as having no change. When the controller 314 detects and determines that the second ground signal GND2 has no change through the control terminal 314C, the RF module 311 is electrically connected to the internal antenna 312 through the controller 314.

Figure 7:
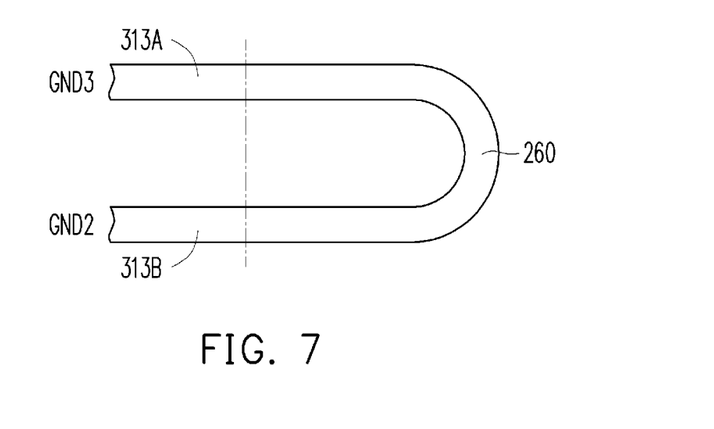
FIG. 7 is a schematic diagram illustrating a situation that the electronic device is connected to the docking device according to the second embodiment of the invention.

When the electronic device 30 is connected to the docking device 20, the independent ground terminal 313B is electrically connected to the connection terminal 313A through the connector 260 of the docking device 20 (as shown in FIG. 4 and FIG. 7). Thus, the independent ground terminal 313B and the connection terminal 313A share the first ground signal GND1. The second ground signal GND2 is regarded as equal to the first ground signal GND1 (and is regarded as equal to the third ground signal GND3). Meanwhile, the second ground signal GND2 is regarded as changed. When the controller 314 detects and determines that the second ground signal GND2 changes through the control terminal 314C, the RF module 311 is electrically connected to the external antenna 22 through the controller 314. Moreover, when the controller 314 detects and determines that the second ground signal GND2 changes, the controller 314 disconnects the electrical connection between the RF module 311 and the internal antenna 312.

A method for changing the second ground signal GND2 will be described with reference to FIG. 6 and FIG. 7. FIG. 6 is a schematic diagram illustrating a situation that the electronic device is not connected to the docking device according to the first embodiment of the invention. Referring to FIG. 6 and FIG. 4, the external antenna connector 313 includes the connection terminal 313A and the independent ground terminal 313B. When the electronic device 30 is not connected to the docking device 20, the external antenna connector 313 of the electronic device 30 is not in contact with the connector 260 of the docking device 20, and the connection terminal 313A and the independent ground terminal 313B are not electrically connected. Meanwhile, the second ground signal GND2 is regarded as not changed.

FIG. 7 is a schematic diagram illustrating a situation that the electronic device is connected to the docking device according to the second embodiment of the invention. Referring to FIG. 4 and FIG. 7, when the electronic device 30 is connected to the docking device 20, the external antenna connector 313 of the electronic device 30 is in contact with the connector 260 of the docking device 20, and the independent ground terminal 313B is electrically connected to the connection terminal 313A through the connector 260 of the docking device 20. The second ground signal GND2 of the independent ground terminal 313B is regarded as equal to the first ground signal GND1 (and regarded as equal to the third ground signal GND3). Meanwhile, the second ground signal GND2 is regarded as changed.

Figure 8:
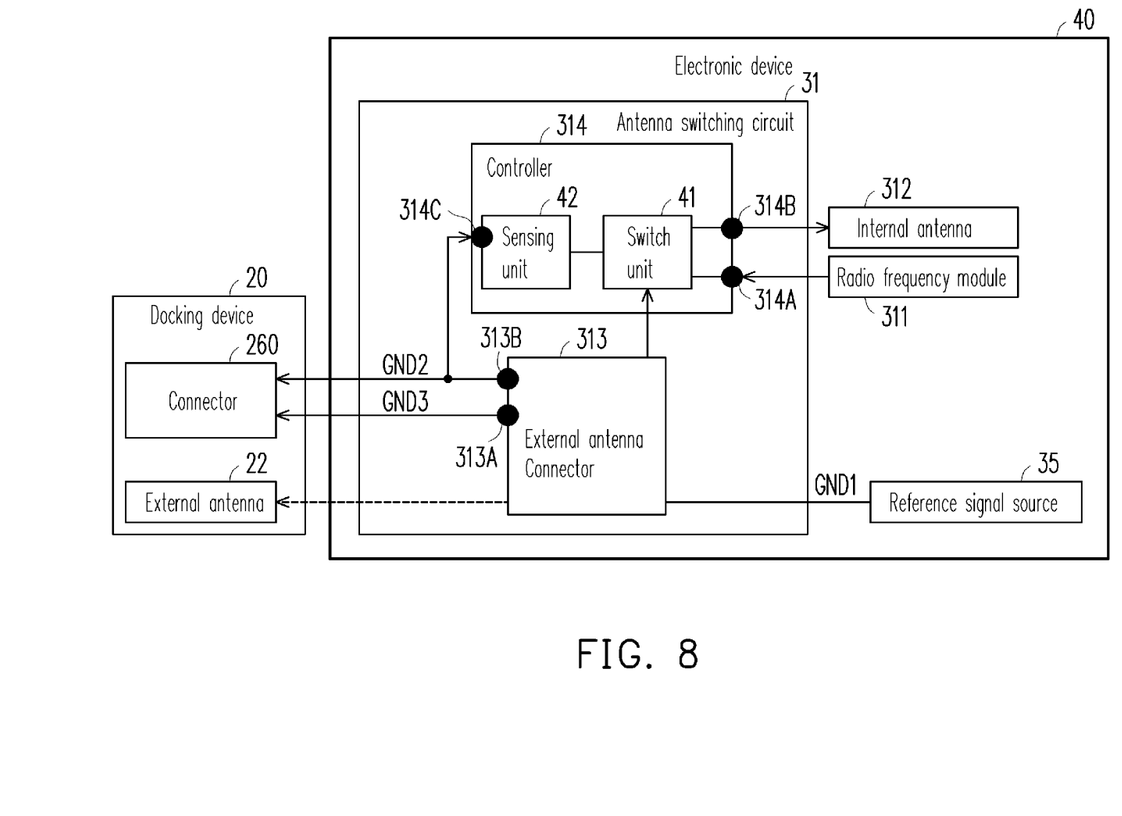
FIG. 8 is a block diagram of an electronic device according to a third embodiment of the invention.

FIG. 8 is a block diagram of an electronic device according to a third embodiment of the invention. Referring to FIG. 4 and FIG. 8, FIG. 8 provides an implementation of the electronic device 30 of FIG. 3 in more details. There is no significant difference between the present embodiment and the first embodiment, and a main difference between the first and third embodiments is described below.

In the present embodiment, the controller 314 of the electronic device 30 includes a switch unit 41 and a sensing unit 42. The switch unit 41 is electrically connected to the first RF terminal 314A, the second RF terminal 314B and the external antenna connector 313. In the present embodiment, the switch unit 41 has a function of electrically connecting the RF module 311 to the internal antenna 312 or the external antenna 22.

The sensing unit 42 is electrically connected to the control terminal 314C and the switch unit 41. The sensing unit 42 has a function of detecting and determining a change in the second ground signal GND2.

When the sensing unit 42 detects and determines a change in the second ground signal GND2, the sensing unit 42 notifies the switch unit 41. When the switch unit 41 receives a notification (for example, a notification signal or change of a predetermined potential) from the sensing unit 42, the RF module 311 is electrically connected to the external antenna 22 through the switch unit 41. After the switch unit 41 receives the notification from the sensing unit 42, the switch unit 41 disconnects the electrical connection between the RF module 311 and the internal antenna 312.

Figure 9:
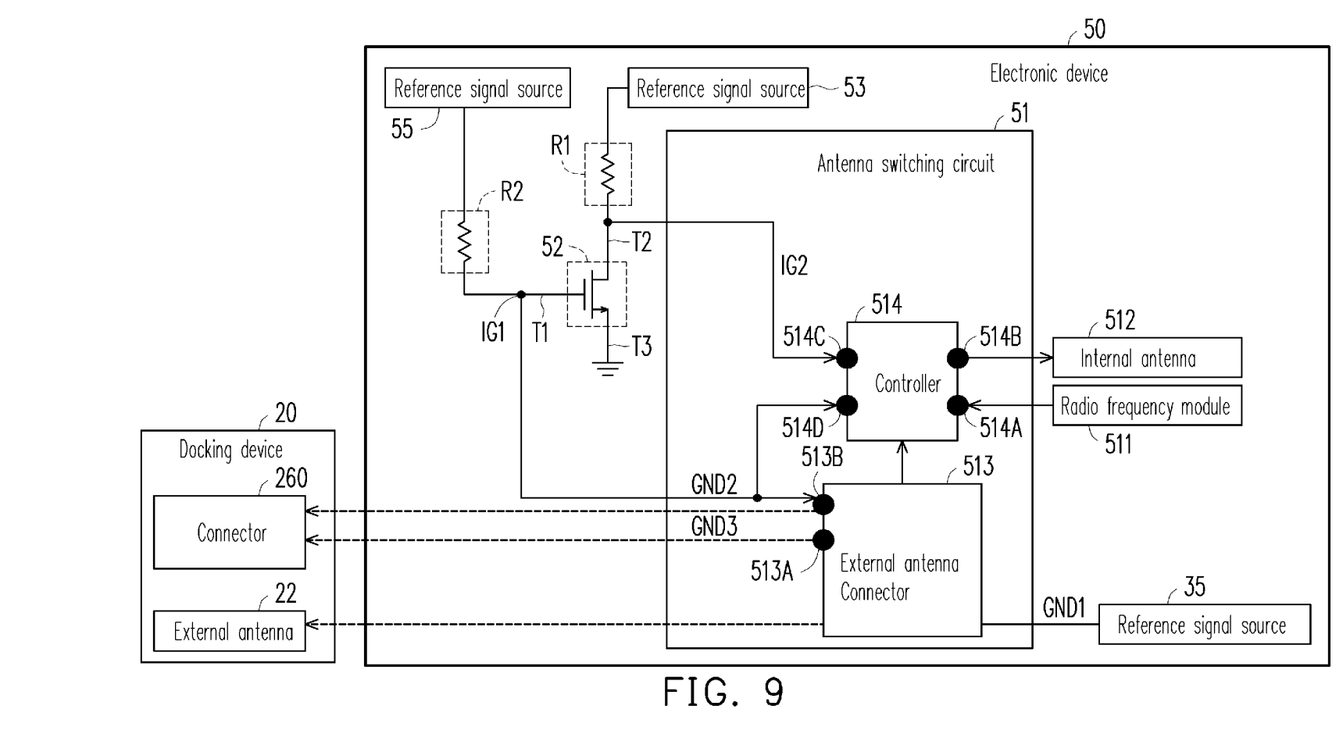
FIG. 9 is a schematic diagram of an electronic device according to a fourth embodiment of the invention.

FIG. 9 is a schematic diagram of an electronic device according to a fourth embodiment of the invention. There is no significant difference between the present embodiment and the first embodiment, and a main difference therebetween is described below.

Referring to FIG. 9, the electronic device 50 includes the reference signal source 35, an antenna switching circuit 51, an RF module 511, an internal antenna 512, a switch unit 52, a reference signal source 53, a reference signal source 55, a resistor R1 and a resistor R2.

The antenna switching circuit 51 includes an external antenna connector 513 and one controller or a plurality of controllers 514.

Implementations of the reference signal source 55, the RF module 511 and the internal antenna 512 can be referred to the technical contents of the embodiment of FIG. 4, and the RF module 511 and the internal antenna 512 are similar to the RF module 311 and the internal antenna 312. The controller 514 is electrically connected to the external antenna connector 513, and is coupled to the switch unit 52. The controller 514 has a first RF terminal 514A, a second RF terminal 514B, a first control terminal 514C and a second control terminal 514D. The first RF terminal 514A and the second RF terminal 514B are electrically connected to the RF module 511 and the internal antenna 512 respectively.

When the electronic device 50 is connected to the docking device 20, the external antenna connector 513 can be electrically connected to the external antenna 22. The external antenna connector 513 has a first connection terminal 513A and an independent ground terminal 513B, where the independent ground terminal 513B is configured for receiving the second ground signal GND2 and providing the second ground signal GND2 as a reference signal (or an independent ground signal) IG1 to the switch unit 52. The connection terminal 513A of the external antenna connector 513 receives the third ground signal GND3. Actually, the reference signal source 35 is connected to the external antenna connector 513 and provides the first ground signal GND1 to the connection terminal 513A, so that the third ground signal GND3 is identical to the first ground signal GND1.

The reference signal source 53 may be, for example, a circuit configured for providing a power or a reference signal. The reference signal source 53 is electrically connected to one end of the resistor R1, and the other end of the resistor R1 is electrically connected to a first terminal T2 of the switch unit 52. A second terminal T3 of the switch unit 52 is coupled to ground. A control terminal T1 of the switch unit 52 is electrically connected to one end of the resistor R2, and the other end of the resistor R2 is electrically connected to the reference signal source 55. The first control terminal 514C and the second control terminal 514D are respectively connected to the first terminal T2 and the control terminal T1 of the switch unit 52, and respectively detect a reference signal (or an independent ground signal) IG2 and the second ground signal GND2.

When the electronic device 50 is not connected to the docking device 20, the reference signal source 55 provides the reference signal IG1 to the control terminal T1 of the switch unit 52, and now the second ground signal GND2 has a logic "high" level. At this time, the second ground signal GND2 turns on the switch unit 52, and the first control terminal 514C is connected to the ground, so that the reference signal IG2 has a logic "low" level.

As described previously, when the electronic device 50 is connected to the docking device 20, the connector 260 connects the independent ground terminal 513B and the connection terminal 513A to conduct the second ground signal GND2 and the first ground signal GND1. Meanwhile, the control terminal T1 of the switch unit 52 is coupled to the ground according to the second ground signal GND2, and the second ground signal GND2 further turns off the switch unit 52, so that the first control terminal 514C is directly connected to the reference signal source 53, and a voltage level of the reference signal IG2 is pulled up to the logic "high" level.

In the present embodiment, when the controller 514 detects that the second ground signal GND2 has the logic "high" level and the reference signal IG2 has the logic "low" level, the controller 514 electrically connects the RF module 511 to the internal antenna 512. Conversely, when the electronic device 50 is connected to the docking device 20, as described previously, the controller 514 detects that the second ground signal GND2 is changed to the logic "low" level and the reference signal IG2 is changed to the logic "high" level, and the controller 514 electrically connects the RF module 511 to the external antenna 22, and disconnects the electrical connection between the internal antenna 512 and the RF module 511.

Figure 10:
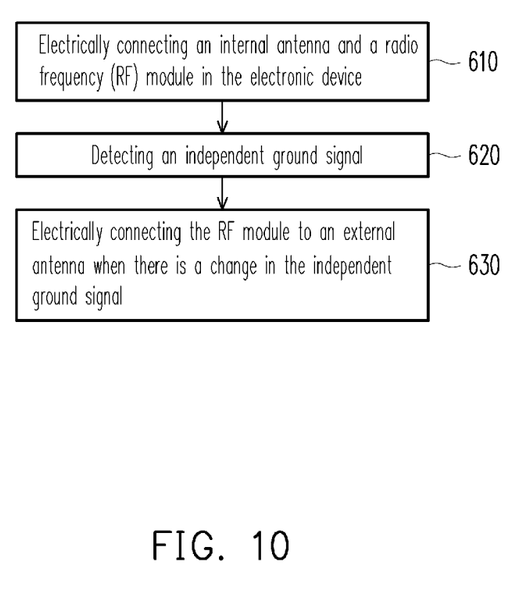
FIG. 10 is a flowchart illustrating an antenna switching method according to a fifth embodiment of the invention.

FIG. 10 is a flowchart illustrating an antenna switching method according to a fifth embodiment of the invention. Referring to FIG. 10 and FIG. 4, FIG. 8 or FIG. 9, the antenna switching method is adapted to the electronic device 30, 40 or 50, and includes following steps. An internal antenna and an RF module in the electronic device are electrically connected (step 610). An independent ground signal on an independent ground terminal of the electronic device is detected (step 620). When there is a change in the independent ground signal, the RF module is electrically connected to an external antenna (step 630).

After the step 630, the antenna switching method further includes a following step. When there is a change in the independent ground signal on the independent ground terminal, the internal antenna and the RF module are disconnected.

In summary, the invention provides the antenna switching circuit and the electronic device and the antenna switching method thereof. Using the electronic switching device in collaboration with the reference signal of the docking system, it can be determined whether the RF module should be switched to the external antenna from the internal antenna according to detecting a change in the independent ground signal on the external antenna connector when the electronic device is connected to the docking system. In this way, the cost of the external antenna connector may be reduced, and meanwhile a transmission loss of the RF signal can be reduced.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. An antenna switching circuit, disposed in an electronic device comprising an internal antenna and a radio frequency (RF) module, the antenna switching circuit comprising:
   a first reference signal source having a first ground signal;
   a second reference signal source having a first reference signal;
   a third reference signal source having a second reference signal;
   an external antenna connector comprising a connection terminal and an independent ground terminal, wherein the external antenna connector is configured to be selectively electrically connected to a connector of an external antenna when the electronic device is connected to a docking device, arranged such that when the external antenna connector is not electrically connected to the connector of the external antenna, the connection terminal and the independent ground terminal are not electrically connected, the independent ground terminal has a second ground signal that is the first reference signal, and the connection terminal has a third ground signal, and when the external antenna connector is electrically connected to the connector of the external antenna, the connection terminal and the independent ground terminal are electrically connected, and the independent ground terminal and the connection terminal share the first ground signal such that the second ground signal and the third ground signal are equal to the first ground signal;
   a switch unit having a control terminal connected to the second reference signal source, a first terminal connected to the third reference signal source, and a second terminal connected to ground; and
   a controller, having a first RF terminal, a second RF terminal, a first control terminal, and a second control terminal, wherein the first RF terminal is electrically connected to the RF module, the second RF terminal is electrically connected to the internal antenna, wherein the first control terminal and the second control terminal of the controller are respectively connected to the first terminal and the control terminal of the switch unit, and configured to respectively detect the second reference signal and the second ground signal;
   wherein when the electronic device is not connected to the docking device, the second reference signal source provides the first reference signal to the control terminal of the switch unit, the second ground signal has a logic high level, the second ground signal turns on the switch unit so that the first control terminal of the controller is connected to the ground, and the second reference signal has a logic low level;
   wherein when the electronic device is connected to the docking device, the control terminal of the switch unit is coupled to the ground according to the second ground signal, the second ground signal turns off the switch unit so that the first control terminal of the controller is directly connected to the third reference signal source, and a voltage level of the second reference signal is pulled up to the logic high level; and
   wherein the controller is configured to electrically connect the RF module to the internal antenna when the controller detects the second ground signal has the logic high level and the second reference signal has the logic low level, and to electrically connect the RF module to the external antenna when the controller detects the second ground signal is changed to the logic low level and the second reference signal is changed to the logic high level.

2. The antenna switching circuit as claimed in claim 1, wherein the external antenna is configured in a docking system.

3. The antenna switching circuit as claimed in claim 1, wherein the controller is configured to disconnect an electrical connection between the RF module and the internal antenna when the controller detects that the second ground signal has the logic low level and the second reference signal has the logic high level.

4. The antenna switching circuit as claimed in claim 1, wherein the controller further comprises a sensing unit configured to detect the change in the second reference signal and the second ground signal.

5. An electronic device, comprising an antenna switching circuit, the antenna switching circuit comprising:
   an internal antenna;
   a radio frequency (RF) module;
   a first reference signal source having a first ground signal;
   a second reference signal source having a first reference signal;
   a third reference signal source having a second reference signal;
   an external antenna connector comprising a connection terminal and an independent ground terminal, wherein the external antenna connector is configured to be selectively electrically connected to a connector of an external antenna when the electronic device is connected to a docking device, arranged such that when the external antenna connector is not electrically connected to the connector of the external antenna, the connection terminal and the independent ground terminal are not electrically connected, the independent ground terminal has a second ground signal that is the first reference signal, and the connection terminal has a third ground signal, and when the external antenna connector is electrically connected to the connector of the external antenna, the connection terminal and the independent ground terminal are electrically connected, and the independent ground terminal and the connection terminal share the first ground signal such that the second ground signal and the third ground signal are equal to the first ground signal;
   a switch unit having a control terminal connected to the second reference signal source, a first terminal connected to the third reference signal source, and a second terminal connected to ground; and
   a controller, having a first RF terminal, a second RF terminal, a first control terminal, and a second control terminal, wherein the first RF terminal is electrically connected to the RF module, the second RF terminal is electrically connected to the internal antenna, wherein the first control terminal and the second control terminal of the controller are respectively connected to the first terminal and the control terminal of the switch unit, and configured to respectively detect the second reference signal and the second ground signal;

wherein when the electronic device is not connected to the docking device, the second reference signal source provides the first reference signal to the control terminal of the switch unit, the second ground signal has a logic high level, the second ground signal turns on the switch unit so that the first control terminal of the controller is connected to the ground, and the second reference signal has a logic low level;

wherein when the electronic device is connected to the docking device, the control terminal of the switch unit is coupled to the ground according to the second ground signal, the second ground signal turns off the switch unit so that the first control terminal of the controller is directly connected to the third reference signal source, and a voltage level of the second reference signal is pulled up to the logic high level; and wherein the controller is configured to electrically connect the RF module to the internal antenna when the controller detects the second ground signal has the logic high level and the second reference signal has the logic low level, and to electrically connect the RF module to the external antenna when the controller detects the second ground signal is changed to the logic low level and the second reference signal is changed to the logic high level.

6. The electronic device as claimed in claim 5, wherein the external antenna is configured in a docking system.

7. The electronic device as claimed in claim 5, wherein the controller is configured to disconnect an electrical connection between the RF module and the internal antenna when the controller detects that the second ground signal is has the logic low level and the second reference signal has the logic high level.

8. The electronic device as claimed in claim 5, wherein the controller further comprises a sensing unit configured to detect the change in the second reference signal and the second ground signal.

* * * * *